United States Patent [19]
Fujita et al.

[11] Patent Number: 5,126,646
[45] Date of Patent: Jun. 30, 1992

[54] NC PROGRAM DRAWING METHOD

[75] Inventors: Naoki Fujita; Toru Hanagata, both of Minamitsuru, Japan

[73] Assignee: Fanuc Ltd., Yamanashi, Japan

[21] Appl. No.: 601,794

[22] PCT Filed: Mar. 6, 1990

[86] PCT No.: PCT/JP90/00294
§ 371 Date: Nov. 5, 1990
§ 102(e) Date: Nov. 5, 1990

[87] PCT Pub. No.: WO90/12348
PCT Pub. Date: Oct. 18, 1990

[30] Foreign Application Priority Data

Mar. 30, 1989 [JP] Japan ................................. 1-79148

[51] Int. Cl.$^5$ ............................................. G05B 19/18
[52] U.S. Cl. ................................. 318/569; 318/570;
318/579; 364/474.24; 364/474.26; 364/474.29;
395/100
[58] Field of Search .................. 318/569, 570, 579;
364/474.24, 474.26, 474.29, 518, 522

[56] References Cited

U.S. PATENT DOCUMENTS 4,697,240 9/1987 Cedar et al. .................. 364/474.24
4,864,520 9/1989 Setoguchi ....................... 364/518 X Primary Examiner—William M. Shoop, Jr.
Assistant Examiner—Saul M. Bergmann
Attorney, Agent, or Firm—Staas & Halsey

[57] ABSTRACT

An NC program drawing method for an interactive numerical control device is provided, in which an NC program is represented by a composite drawing composed of a solid drawing (1a, 1b, 1c) and a wire frame drawing (1d, 1e), whereby the drawing of machining profiles and tool paths, etc., can be processed in a short time and the machining profiles can be easily recognized, thus facilitating the creation of machining programs. According to a preferred mode of carrying out the invention, simple surfaces and the like are drawn by the solid drawing method (1a, 1b, 1c), and complicated profiles (1d, 1e) and tool paths, etc., are drawn by the wire frame drawing method.

3 Claims, 5 Drawing Sheets

| PROFILE / PROCESS | DRAWING METHOD |
|---|---|
| MACHINING PROFILE | SOLID DRAWING, WIRE FRAME DRAWING |
| TOOL PATH | WIRE FRAME DRAWING |
| TOOL SHAPE | SOLID DRAWING, WIRE FRAME DRAWING |

5 PARAMETERS

FIG. 6

NC PROGRAM DRAWING METHOD

TECHNICAL FIELD

This invention relates to an NC program drawing method for interactive numerical control devices, and more particularly, to an NC program drawing method for an operation check of NC programs.

BACKGROUND ART

In interactive numerical control devices, programming is effected in such a way that queries on various items requiring data are systematically made by the system, and an operator inputs required values in answer to the queries. Accordingly, the operator can create programs without the need to comply with language rules for automatic programming or an NC tape format.

Programs produced in this manner must be checked for errors, and in interactive numerical control devices, the checking is executed by using a check drawing function. Namely, a simulation is carried out wherein profiles such as the shapes of a material and a tool are drawn on a display screen and the tool is moved along a path instructed by the NC program so that the workpiece is progressively machined into a desired shape.

As techniques for drawing a three-dimensional shape, a solid drawing method and a wire frame drawing method are known. According to the solid drawing method, a complicated profile of a solid body is represented by outer surfaces enclosing the body, the various types of surfaces being enclosed by ridgelines. The wire frame drawing method uses figure elements such as a straight line, a second degree curve, and a spline curve, etc., and a three-dimensional shape is represented solely by the lines of these elements.

According to the solid drawing method, since the drawn profile consists of surfaces, it is easy to recognize an actual machining profile, and when a workpiece is machined, the process can be easily followed because the surfaces are cut away. It is, however, difficult to draw a tool path and a detailed profile to be machined, and since the objects are represented by surfaces, a vast quantity of complicated data must be processed, requiring much time for the drawing. Moreover, a problem arises in that colors become blurred when small parts are drawn.

The wire frame drawing method is better, in that it can draw a tool path and a detailed profile to be machined, but since objects are represented solely by lines, it is difficult to recognize the drawn workpiece as a solid body.

Therefore, although each of the above two drawing methods compensates for the shortcomings of the other, conventionally the solid drawing method and the wire frame drawing method are used independently as different drawing methods.

DISCLOSURE OF THE INVENTION

This invention was created in view of the above circumstances, and an object thereof is to provide an NC program drawing method having the features of both the solid drawing method and the wire frame drawing method.

To achieve the above object, according to this invention, there is provided an NC program drawing method for an interactive numerical control device, characterized in that an NC program is represented by a composite drawing composed of a solid drawing and a wire frame drawing.

An edited and input NC program is represented by a composite drawing composed of a solid drawing and a wire frame drawing, whereby the drawing of a machining profile, and a tool path, etc., can be processed in a short time, and the creation of machining programs is made easy because the machining profile is easily recognized. Particularly, according to a preferred mode of carrying out the invention, simple surfaces and the like are drawn by the solid drawing method, and complicated profiles and tool paths, etc., are drawn by the wire frame drawing method.

BRIEF DESCRIPTION OF THE DRAWINGS

FIG. 6 is a diagram showing drawing parameters.

BEST MODE OF CARRYING OUT THE INVENTION

An embodiment of this invention will be described with reference to the drawings.

Figure 2:
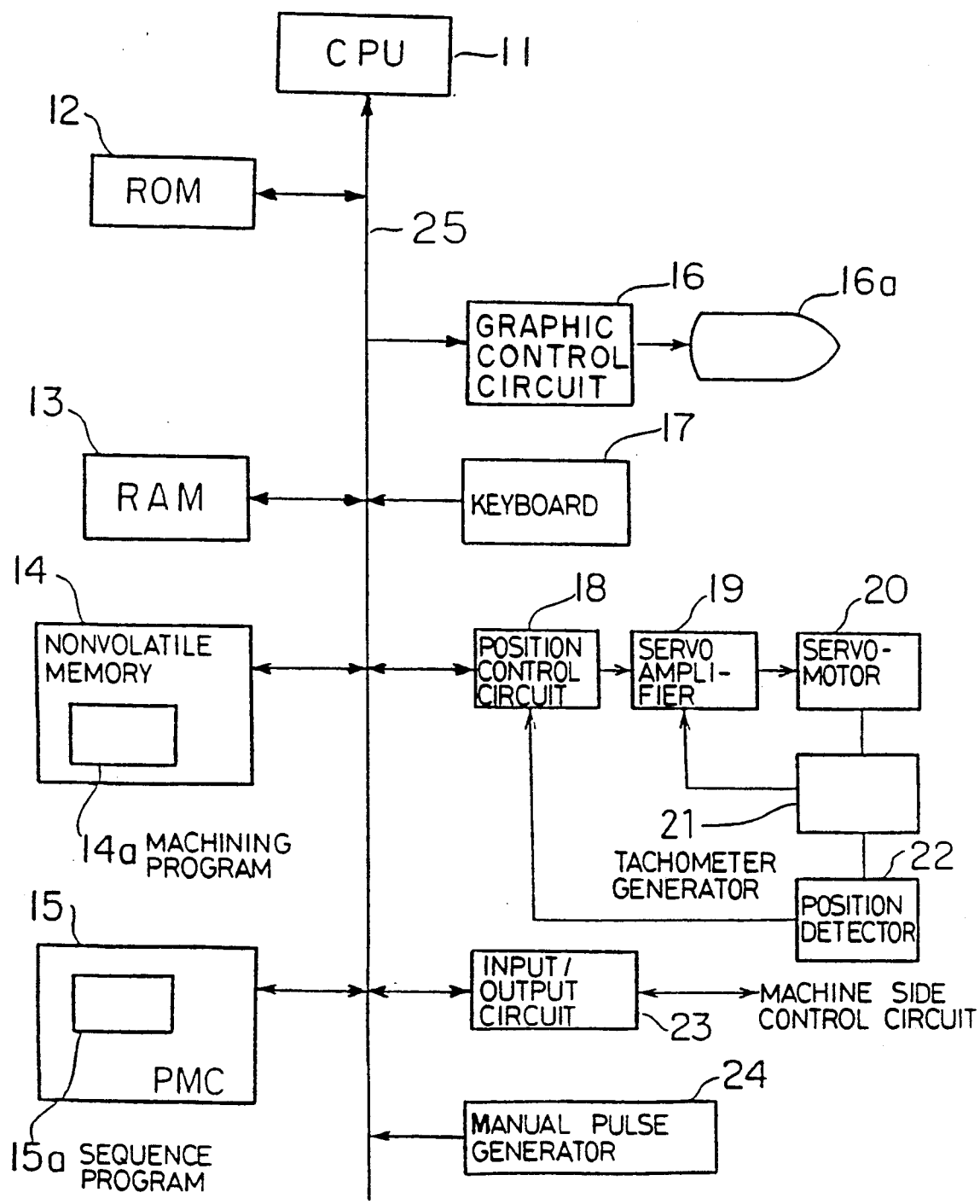
FIG. 2 is a block diagram showing hardware of a numerical control device (CNC) for carrying out the invention.

FIG. 2 is a block diagram showing hardware of a numerical control device (CNC) for carrying out the invention, wherein a processor 11 globally controls the numerical control device in accordance with a system program stored in a ROM 12, which comprises an EPROM or EEPROM. An SRAM is used for a RAM 13 and stores various data, and a nonvolatile memory 14 stores a machining program 14a created in accordance with an NC program of the interactive numerical control device, parameters for selecting a solid drawing or a wire frame drawing, and other data, and comprises a battery backup CMOS or the like, so that the contents thereof are retained even after the power of the numerical control device is cut off.

A PMC (programmable machine controller) 15 receives an M function and a T function, etc., converts same into signals for controlling a machine tool in accordance with a sequence program 15a, and outputs the signals. The PMC also receives signals from limit switches of the machine side and switch signals from a machine operator panel, and processes the received signals in accordance with the sequence program 15a. The required signals are stored in the RAM 13 through a bus 25 and read by the processor 11.

A graphic control circuit 16 converts data, such as data on current positions and movement amounts, etc., of individual axes, into display signals, and outputs the signals to a display device 16a. The display device 16a displays images based on the input data, by the solid drawing method or wire frame drawing method or a composite drawing of the two methods. A CRT, liquid crystal display device or the like is used for the display device 16a, and a keyboard 17 is used for inputting various data.

A position control circuit 18 receives a position command from the processor, and outputs a speed command signal to a servo amplifier 19 to control a servomotor 20. The servo amplifier 19 amplifies the speed command signal and drives the servomotor 20.

A position detector 22 for outputting a position feedback signal, and a tachometer generator 21 for generating a speed feedback signal, are connected to the servomotor 20. The position detector 22 comprises a pulse coder or the like, and feeds a position feedback pulse back to the position control circuit 18. A linear scale or the like may be used as the position detector. The tachometer generator 21 feeds a voltage signal corresponding to the rotation speed of the servomotor 20 back to the servo amplifier 19. The tachometer generator 21 may be omitted and a speed signal produced from the position signal of the position detector 22 instead. Although in practice, the above elements must be provided in a number corresponding to the number of the axes, the arrangement of the elements is the same and thus only those elements associated with one axis are illustrated in the drawing.

An input/output circuit 23 performs a transfer of signals with respect to the machine side. Specifically, the input/output circuit 23 receives the limit switch signals from the machine side and the switch signals from the machine operator panel, and the PMC 15 reads these signals. The circuit 23 also receives control signals for controlling pneumatic actuators, etc., on the machine side from the PMC 15, and outputs the signals to the machine side. A manual pulse generator 24 outputs a pulse train for effecting minute movements of the individual axes in accordance with a rotational angle thereof, and is incorporated into the machine operator panel.

Note, a spindle control circuit for controlling a spindle, a spindle amplifier, and a spindle motor, etc., are omitted from the drawing.

Further, although the figure illustrates only one processor, a multiprocessor system including a plurality of processors may be employed depending on the system configuration.

An NC program drawing method according to this invention will be described.

Figure 1:
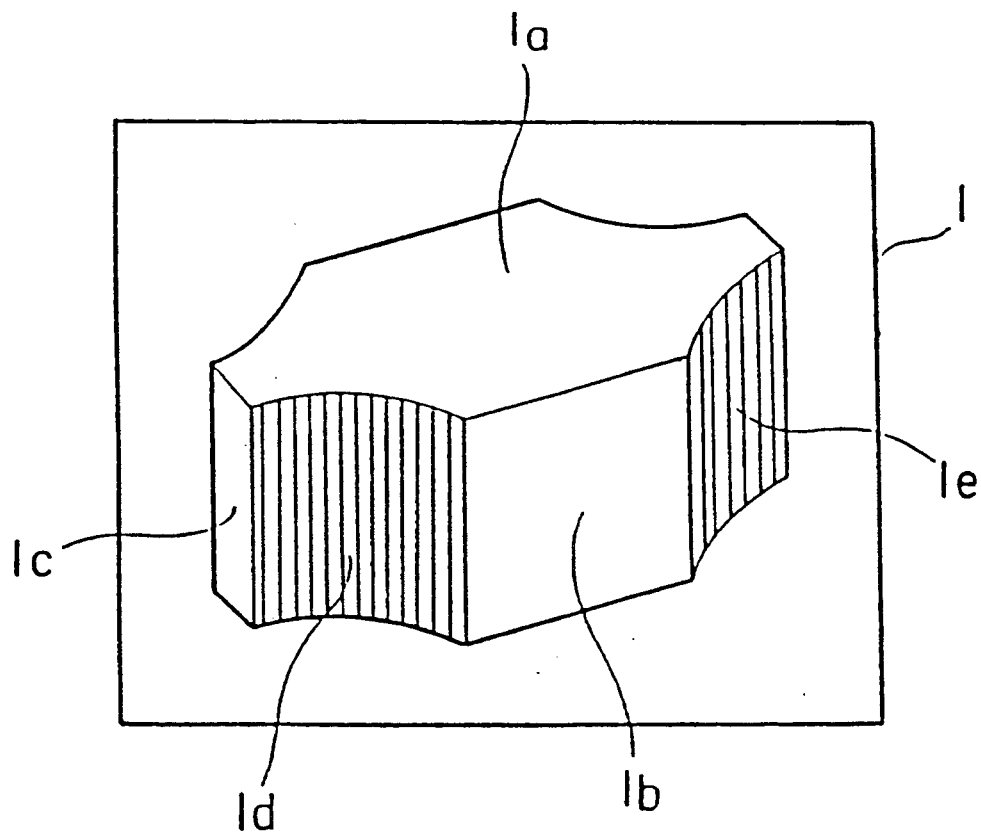
FIG. 1 is a diagram of a display screen illustrating an NC program drawing method according to one embodiment of this invention.

FIG. 1 is a diagram of a display screen illustrating the NC program drawing method according to an embodiment of the invention, in which a machining profile according to an NC program is shown. In this embodiment, a display screen 1 displays a machining profile composed of plane surfaces 1a, 1b and 1c, drawn by the solid drawing method, and curved surfaces 1d and 1e drawn by the wire frame drawing method. By drawing simple surfaces, e.g., plane surfaces, by the solid drawing method and complex surfaces, e.g., curved surfaces, by the wire frame drawing method as in this embodiment, it is possible to greatly improve the image processing capability and reduce the time required for the drawing.

Although not illustrated, a tool path, etc., are drawn by the wire frame drawing method, whereby the drawing of machining profiles and tool paths, etc., can be processed in a short time and the creation of machining programs is facilitated.

Figure 3:
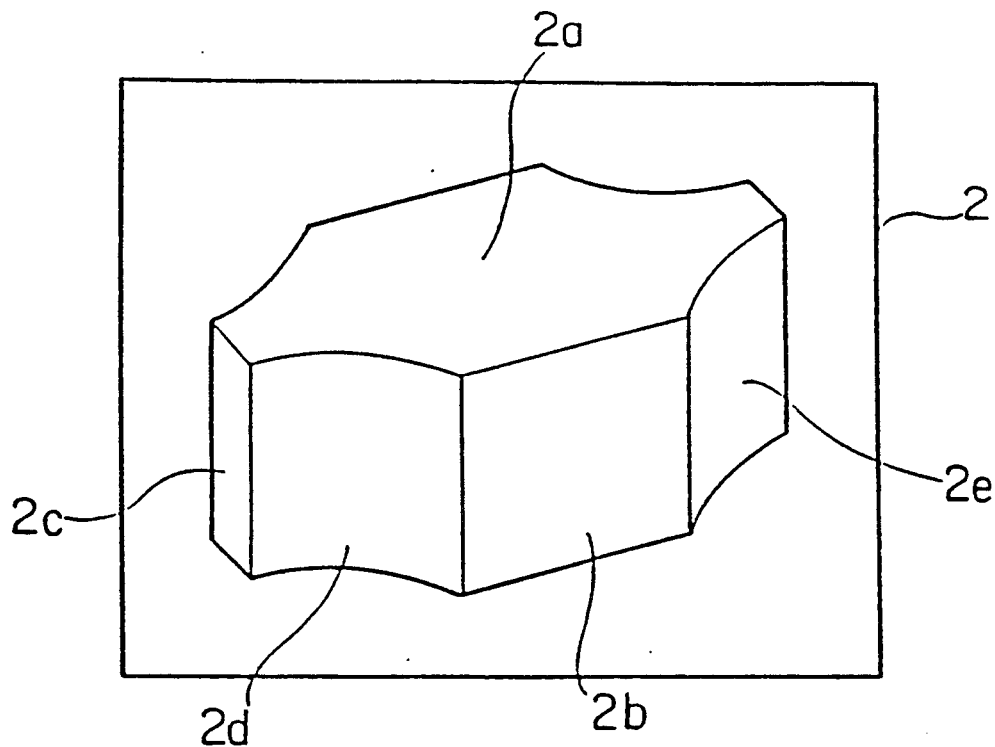
FIG. 3 is a diagram showing a display screen in which the machining profile in FIG. 1 is drawn by a solid drawing method.

FIG. 3 shows the machining profile of FIG. 1 when drawn by the solid drawing method. A display screen 2 of FIG. 3 displays the machining profile for which both the plane surfaces 2a, 2b and 2c and the curved surfaces 2d and 2e are drawn by the solid drawing method, whereby the machining profile can be easily recognized. In this case, however, if a process of cutting the material by a tool is reproduced, much time is required for the image processing, and therefore, the cutting process cannot be reproduced on a real-time basis.

Figure 4:
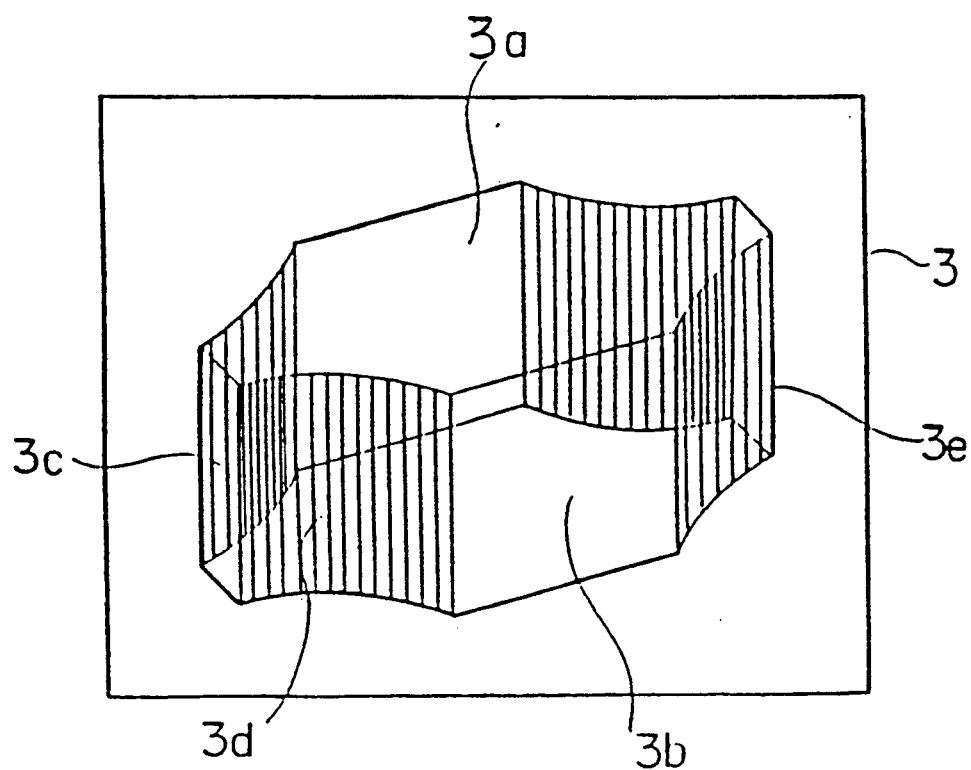
FIG. 4 is a diagram showing a display screen in which the machining profile in FIG. 1 is drawn by a wire frame drawing method.

FIG. 4 shows a display screen in which the machining profile of FIG. 1 is drawn by the wire frame drawing method. If the entire machining profile is drawn by the wire frame drawing method, the profile is shown by ridgelines alone, and accordingly, it is difficult to recognize the plane surfaces 3a, 3b and 3c and curved surfaces 3d and 3e, etc., three-dimensionally.

Figure 5:
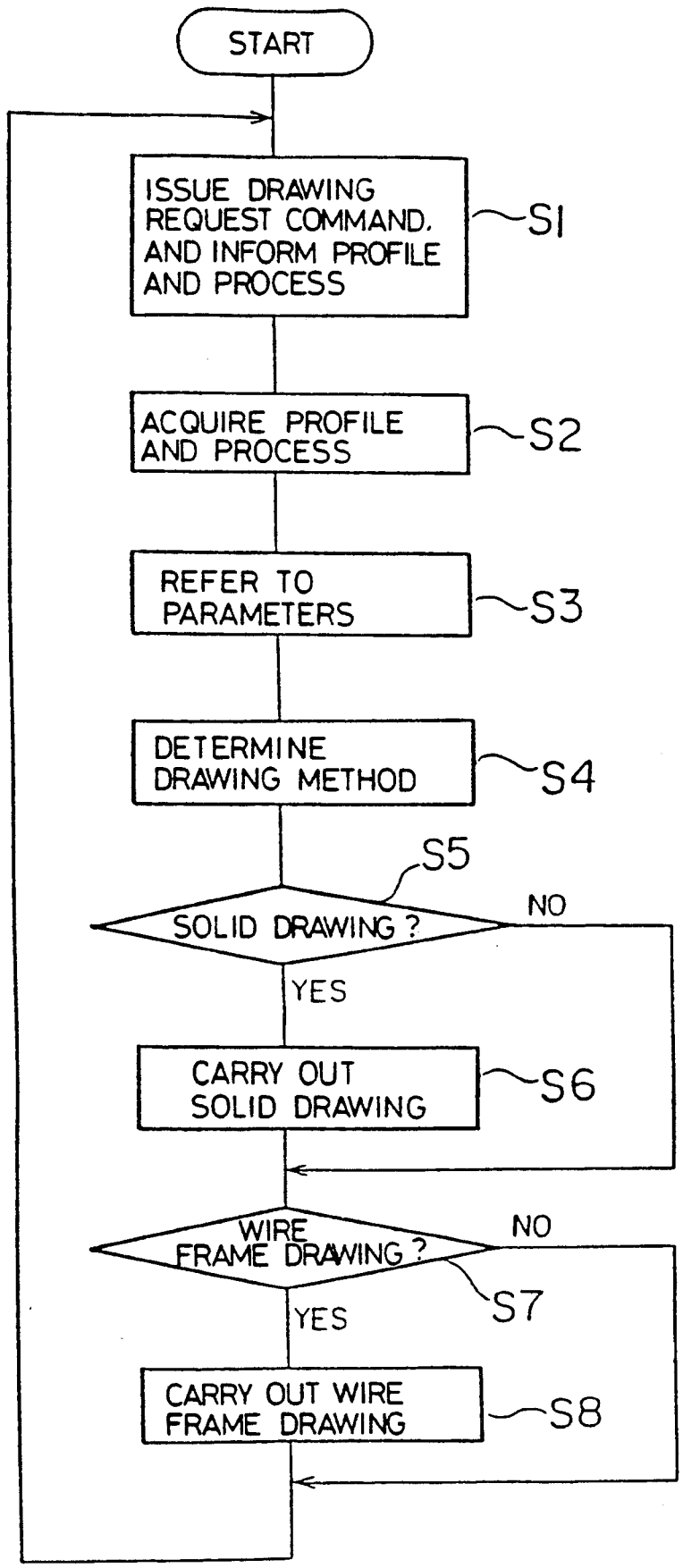
FIG. 5 is a flowchart according to the embodiment.

FIG. 5 is a flowchart for carrying out the above-described embodiment, in which the numbers following symbol "S" denote step numbers.

[S1] A drawing request command is issued, and simultaneously, a profile type and a process type to be reproduced are input.

[S2] Upon reception of the drawing request command, the process type to be reproduced is determined from an NC program created by the interactive numerical control device.

[S3] Reference is made to parameters.

[S4] A drawing method to be used is determined by referring to previously set drawing parameters, in accordance with the types of profile and process.

[S5] It is determined whether or not the drawing method determined in S3 is the solid drawing method. If the solid drawing method has been selected, the flow proceeds to S5, and if not, the flow proceeds to S7.

[S6] The solid drawing is carried out.

[S7] It is determined whether or not the drawing method determined in S3 is the wire frame drawing method. If the wire frame drawing method has been selected, the flow proceeds to S8, and if not, the flow returns to S1.

[S8] The wire frame drawing is carried out.

FIG. 6 is a diagram showing the drawing parameters referred to in S3. The parameters 5 set the drawing methods in accordance with the profile and process. A machining profile such as that shown in FIG. 1 is represented by a composite drawing composed of a solid drawing and a wire frame drawing, and a tool path is drawn by the wire frame drawing method. The tool shape is represented by the composite drawing composed of a solid drawing and a wire frame drawing, depending on the shape. Therefore, by previously setting the parameters in this manner, the drawing methods can be appropriately set in accordance with the types of profiles, etc., to be drawn.

Thus, since a workpiece or the like having a complicated machining profile is represented by the composite drawing composed of the solid drawing and the wire frame drawing, the machining profile can be easily recognized. Further, portions with complex profiles can be drawn by the wire frame drawing method, and accordingly, the image processing requires less time and images can be reproduced on a real-time basis.

As described above, according to this invention, the drawing of machining profiles and tool paths, etc., can be processed in a short time, and the creation of machining programs can be facilitated.

I claim:

1. An NC program drawing method for an interactive numerical control device including a display device, comprising the steps of:

(a) representing a composite drawing using a solid drawing and a wire frame drawing;
(b) displaying the composite drawing on the display device; and
(c) automatically creating a machining program based on the solid drawing and the wire frame drawing.

2. An NC program drawing method according to claim 1, further comprising the step of:
(d) determining whether the NC program should be represented by one of the solid drawing, the wire frame drawing, and the composite drawing in accordance with types of profiles or processes instructed by the NC program.

3. An NC program drawing method according to claim 1, wherein step (b) includes the substep of:
(b1) drawing the composite drawing by using the solid drawing to represent simple surfaces and by using the wire frame drawing to represent complicated profiles and tool paths.

* * * * *